United States Patent [19]

Marchese et al.

[11] Patent Number: 5,411,819
[45] Date of Patent: May 2, 1995

[54] PROCESS FOR PREPARING A SOLID, POLYMERIC ELECTROLYTE BASED ON POLYVINYL ETHERS

[75] Inventors: Luca Marchese, Milan; Maria Andrei, Berceto; Arnaldo Roggero, San Donato Milanaese, all of Italy

[73] Assignee: Eniricerche S.p.A., Milan, Italy

[21] Appl. No.: 25,883

[22] Filed: Mar. 3, 1993

[30] Foreign Application Priority Data

Mar. 4, 1992 [IT] Italy .................................. MI92A0474

[51] Int. Cl.⁶ .............................................. H01M 6/18
[52] U.S. Cl. ........................................ 429/192; 252/622
[58] Field of Search .......................... 429/192; 252/62.2

[56] References Cited

U.S. PATENT DOCUMENTS

| | | | |
|---|---|---|---|
| 4,303,748 | 12/1981 | Armand et al. | 429/192 |
| 4,471,037 | 9/1984 | Bannister | 429/191 |
| 4,886,716 | 12/1989 | Roggero et al. | 429/192 |
| 5,064,548 | 11/1991 | Roggero et al. | 429/192 X |
| 5,173,205 | 12/1992 | Marchese et al. | 252/62.2 |

FOREIGN PATENT DOCUMENTS

| | | |
|---|---|---|
| 0301774 | 2/1989 | European Pat. Off. . |
| 0312160 | 4/1989 | European Pat. Off. . |
| 2523769 | 9/1983 | France . |
| 2568574 | 2/1986 | France . |

*Primary Examiner*—John S. Maples
*Attorney, Agent, or Firm*—Rogers & Wells

[57] ABSTRACT

Process for preparing a solid, polymeric electrolyte, in membrane from, characterized in that:

(1) a mixture is prepared, which contains:
  (a) a vinyl ether (I) of formula $$R-(-O-CH_2-CH_2-)_n-O-CH=CH_2$$

wherein R=Me or Et and n is an integer comprised within the range of from 1 to 16;
  (b) a divinyl ether of formula $$CH_2=CH-(-O-CH_2-CH_2-)_m-O-CH=CH_2$$

wherein m is integer comprised within the range of from 1 to 10, in a molar ratio to the vinyl ether (I) comprised within the range of from 2:98 to 60:40;
  (c) an ionic compound in an amount comprised within the range of from 1 to 30% by weight;
  (d) an oligomer or a dipolar aprotic liquid in an amount comprised within the range of from 0 to 80% by weight;
  (e) a photoinitiator in an amount comprised within the range of from 0 to 10% by weight;

(2) the above mixture is applied onto an inert support and is exposed to a source of ultraviolet light, or to an electron beam.

18 Claims, 2 Drawing Sheets

PROCESS FOR PREPARING A SOLID, POLYMERIC ELECTROLYTE BASED ON POLYVINYL ETHERS

FIELD OF THE INVENTION

The present invention relates to a process for preparing a solid, polymeric electrolyte, to said solid, polymeric electrolyte and to its use in electrochemical devices which contain it.

The solid, polymeric electrolytes consist of a solid solution of an ionic compound in a solid polymeric matrix deriving from the polymerization of monomers containing a heteroatom, preferably oxygen.

BACKGROUND OF THE INVENTION

The most widely diffused solid polymeric electrolytes are those based on a polyethylene oxide, or on another polyether, such as, for example, those as disclosed U.S. Pat. No. 4,471,037; FR 2,523,769; FR 2,568,574; and EP 13,199.

Such materials display interesting values of ionic conductivity only at relatively high temperatures, at which they unfortunately display a low mechanical strength: they are consequently not really interesting for such practical uses as electrolytic separators in electrochemical devices, optical and electrochromic display and in sensors.

In U.S. Pat. No. 5,173,205 and IT 1,222,929 particular polymeric polyvinyl ether-based electrolytes are disclosed which display both an improved mechanical strength and a satisfactory conductivity even at relatively low temperatures.

Preparing such materials requires complex multistep processes comprising the copolymerization of suitable vinyl ethers at a temperature of the order of $-75°/-80°$ C. for a time comprised within the range of from 30 to 60 minutes, dissolving the resulting solid, crosslinked polyvinyl ether in a suitable solvent, blending said solution with a solution containing an ionic compound and evaporating the solvent in order to obtain a membrane.

In U.S. Pat. No. 5,173,205, the suitably functionalized polyvinyl ether is crosslinked by means of a diprotic crosslinker agent during the step of polymer blending with the ionic compound. This step is followed by solvent evaporation in order to obtain the membrane.

SUMMARY OF THE INVENTION

We have found now a process for preparing solid, polymeric electrolytes based on polyvinyl ethers, which process does not require the just described complex multi-step processes.

Such a process consists in polymerizing and crosslinking suitable vinyl ethers in an organic solvent, directly in the presence of an ionic compound and possibly in the presence of an oligomer or of a dipolar aprotic liquid.

The solid, polymeric electrolytes obtained according to the process of the present invention in the presence of a dipolar liquid supply improved performance over the polivinyl ethers known from the prior art as regards the mechanical strength and the electrical conductivity. Furthermore, such membranes result to be easily handeable and display good adhesive properties. Therefore, the subject-matter of the present invention is a process for preparing a solid, polymeric electrolyte, in membrane form, which consists of a solid solution of an electrolyte in a polymeric matrix of polyvinyl ether, characterized in that:

(1) a mixture (M) is prepared, which contains:
(a) a vinyl ether of formula

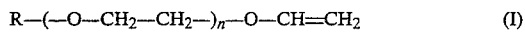

$$R-(-O-CH_2-CH_2-)_n-O-CH=CH_2 \quad (I)$$

wherein $R=Me$ or $Et$ and $n$ is an integer comprised within the range of from 1 to 16;
(b) a divinyl ether of formula

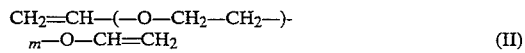

$$CH_2=CH-(-O-CH_2-CH_2-)_m-O-CH=CH_2 \quad (II)$$

wherein $m$ is an integer comprised within the range of from 1 to 10, in a molar ratio to the vinyl ether (I) comprised within the range of from 2:98 to 60:40;
(c) an ionic compound in an amount comprised within the range of from 1 to 30% by weight;
(d) an oligomer or a dipolar aprotic liquid in an amount comprised within the range of from 0 to 80% by weight;

(2) the above mixture is applied onto an inert support and is submitted to polymerization.

The step (1) is suitably accomplished by simultaneously mixing the components (a), (b), (c), and (d) together with each other.

The polymerization step (2) can be accomplished by exposing the resulting mixture from step (1), after applying it onto an inert support, to a source of ultraviolet light. In that case, the mixture (M) will also contain a photoinitiator. Such a photoinitiator is of cationic type and can be, e.g., a diaryliodonium, triarylsulfonium, sulfoxonium salt, or a metal ferrocene salt. The photoinitiator is used in an amount comprised within the range of from 0.5 to 10% by weight, preferably of from 1 to 5% by weight.

The polymerization step (2) can also be advantageously accomplished by exposing the mixture, applied onto an inert support, to an electron beam ray source. In this case, the presence of a photoinitiator is not required.

The present Applicant found also, and this is a particular object of the present invention, that, if, as the ionic compound (c), lithium tetrafluoroborate is used and the mixture (M) is prepared in the step (1) by adding the components according to a suitable sequence, the polymerization of the step (2) takes place spontaneously. Therefore, is this case, neither the exposure to an U.V. light the presence of a photoinitiator, nor the exposure to an electron beam ray source, will be necessary in order to achieve the polymerization. Therefore, a particular object of the present invention is a process for preparing a solid, polymeric electrolyte, in membrane form, which solid, polymeric electrolyte consists of a solid solution of an electrolyte in a polymeric matrix of polyvinyl ether, characterized in that:

(1) a mixture (M) is prepared, which contains:
(a) a vinyl ether of formula

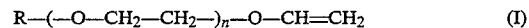

$$R-(-O-CH_2-CH_2-)_n-O-CH=CH_2 \quad (I)$$

wherein $R=Me$ or $Et$ and $n$ is an integer comprised within the range of from 1 to 16;
(b) a divinyl ether of formula

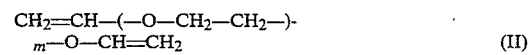

$$CH_2=CH-(-O-CH_2-CH_2-)_m-O-CH=CH_2 \quad (II)$$

wherein m is an integer comprised within the range of from 1 to 10, in a molar ratio to the vinyl ether (I) comprised within the range of from 2:98 to 60:40;

(c) lithium tetrafluoroborate in an amount comprised within the range of from to 30% by weight;

(d) an oligomer or dipolar aprotic liquid in an amount comprised within the range of from 0 to 80% by weight;

with a mixture (A); containing the components (c) and (d), being added to a mixture (B) containing the components (a) and (b);

(2) the above mixture (M) is applied onto an inert support and is allowed to polymerize for a time comprised within the range of from 0.5 to 30 hours.

DESCRIPTION OF THE PREFERRED EMBODIMENTS

The polymerization time varies as a function of the composition of the mixture, and of the type of plasticizer used. In particular, it decreases with increasing LiBF$_4$ concentration, and when propylene carbonate is used as the dipolar aprotic liquid. The membranes obtained according to this particular aspect of the present invention result to be very easily handeable and display extremely good adhesive properties.

In general, according to the present invention, in the step (1) the molar ratio of the divinyl ether (II) to the vinyl ether (I) is preferably comprised within the range of from 8:92 to 20:80, the amount of ionic compound is comprised within the range of from 5 to 20% by weight, and the amount of dipolar aprotic liquid is comprised within the range of from 50 to 80% by weight. The vinyl ether (I) can be prepared by reacting ethyl vinyl ether:

$$CH_3—CH_2—O—CH=CH_2 \quad \text{(III)}$$

with a polyoxyethylene glycol monoether, which may be represented with the formula:

$$RO—(—CH_2—CH_2—O—)_n—H \quad \text{(IV)}$$

wherein R and n have the same meaning as reported hereinabove with regard to formula (I).

The reaction is carried out in the liquid phase, with an excess of compound (III) relatively to the compound (IV), preferably at the reaction mixture refluxing temperature under room pressure and in the presence of a transesterification catalyst. Specific examples of catalysts suitable for the intended purpose are mercury-(II) salts.

The divinyl ether (II) can be prepared by reacting a vinyl ether (III) with a polyoxyethylene glycol of formula:

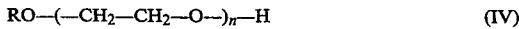

$$HO—(—CH_2—CH_2—O—)_m—H$$

wherein m has the same meaning as indicated hereinabove with regard to formula (II), under similar conditions to those as reported hereinabove for the preparation of the vinyl ether (I).

The ionic compound used in the step (1) is a salt, preferably a perchlorate, triflate, tetrafluoroborate or hexafluoroarsenate, of (either univalent or multivalent) metals, and, in particular, of lithium, sodium, potassium, calcium, copper, zinc, magnesium, lead, tin and aluminum, used in such an amount as to yield an atomic ratio of oxygen contained in the polyvinyl ether to the metal, comprised within the range of from approximately 4:1 to approximately 25:1. The metal preferably is lithium.

The dipolar aprotic liquid preferably is: propylene carbonate, ethylene carbonate, gammabutyrolactone, acetonitrile and mixtures thereof.

The oligomer can be selected from the oligovinyl ethers deriving from monomers of type (I), from ethylene-oxide-sequence-containing oligomers, such as polyethylene glycol, or from oligoethylene glycol dialkyl ethers, such as tetraglyme.

The mixture (M) of the step (1) is generally prepared by mixing the components and stirring until a colourless, homogeneous solution is obtained. In the particular case where the ionic compound used is LiBF$_4$, the mixture (M) is prepared by adding a mixture (A), containing the components (c) and (d), to a mixture (B) containing the components (a) and (b).

In the step (2), the support may be a film of an inert plastics material, such as, e.g., teflon, polyethylene and Mylar, it may be glass, or it may directly be the surface of a lithium anode or of a composite cathode constituted by an oxide or sulfide of a transition metal. In the latter case, said polymeric electrolyte may also constitute the ionically conductive polymeric component used in the formulation of the composite cathod.

The polymerization process is rather fast, starts with irradiation, but can continue even with no further exposure to U.V. light, and it can be accelerated by thermal way, by heating at a temperature of round 50° C.

A solid, polymeric electrolyte is obtained as a membrane having a thickness of the order of 50–200 microns.

In particular, when in the process disclosed above, the component (d) is a dipolar aprotic liquid in an amount comprised within the range of from 50 to 80% by weight, the obtained electrolyte is mechanically stronger, dimensionally stabler and displays a higher conductivity, even at fairly low temperatures, as compared to the polymeric polyvinyl ether-based electrolytes known from the prior art.

The following experimental Examples are illustrative and do not limit the purview of the present invention.

EXAMPLES

Example 1

Preparation of an electrolytic membrane by starting from a vinyl ether of formula (I) with n=2 and a divinyl ether of formula (II) with m=4.

Inside a glove-box, under an argon atmosphere, the following components were mixed together with each other:

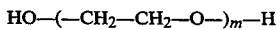

| Component | Weight (g) | % by weight |
|---|---|---|
| Vinyl ether (I) | 2.00 | 59.9 |
| Divinyl ether (II) | 0,27 | 8.1 |
| LiClO$_4$ | 0.33 | 9.9 |
| Propylene carbonate | 0.71 | 21.2 |

| Component      | Weight (g) | % by weight |
| -------------- | ---------- | ----------- |
| Photoinitiator | 0.03       | 0.9         | wherein the photoinitiator bis(4-diphenylsulfoniumphenyl)sulfide-bis-hexafluorophosphate. The mixture was stirred with a magnetic drive stirrer until a homogeneous, colourless solution was obtained which was then coated as a constant-thickness film on a PTFE sheet by using a bar Hand Coater.

The resulting film was exposed to U.V. light for 5 seconds, by means of a medium pressure mercury vapour lamp. The mixture was then heated for a few minutes at 40°–50° C.

In that way, a homogeneous, colourless electrolytic membrane was obtained in handeable film form, with good adhesion properties and having a thickness of 100 microns.

The ionic conductivity at room temperature, as measured by placing the membrane between two fastening steel electrodes, resulted to be of approximately $1.3 \times 10^{-5}$ S/cm.

Example 2

Preparation of an electrolytic membrane by starting from a vinyl ether of formula (I), with $n=5$ and $R=$methyl, and a divinyl ether of formula (II) with $m=4$.

Inside a glove-box, under an argon atmosphere, the following components were mixed together with each other:

| Component          | Weight (g) | % by weight |
| ------------------ | ---------- | ----------- |
| Vinyl ether (I)    | 2.03       | 33.8        |
| Divinyl ether (II) | 0.53       | 8.8         |
| LiClO$_4$          | 0.354      | 5.9         |
| Propylene carbonate| 3.042      | 50.7        |
| Photoinitiator     | 0.048      | 0.8         | wherein the photoinitiator is bis(4-diphenylsulfoniumphenyl)sulfide-bis-hexafluorophosphate. The mixture was stirred with a magnetic drive stirrer until a homogeneous, colourless solution was obtained, which was then coated as a constant-thickness film on a PTFE sheet by using a bar Hand Coater for thickness control.

The resulting film was exposed to U.V. light for 5 seconds, using a medium pressure mercury vapour lamp.

In that way, a homogeneous, colourless electrolytic membrane is obtained, in handeable film form, which displays good adhesive properties and has a thickness of 100 microns.

The glass transition temperature (Tg) of the membrane, as determined by DSC, is of $-83°$ C. and the membrane is completely amorphous at higher temperatures than its Tg; in fact, no crystallization peaks are detected.

Figure 1:
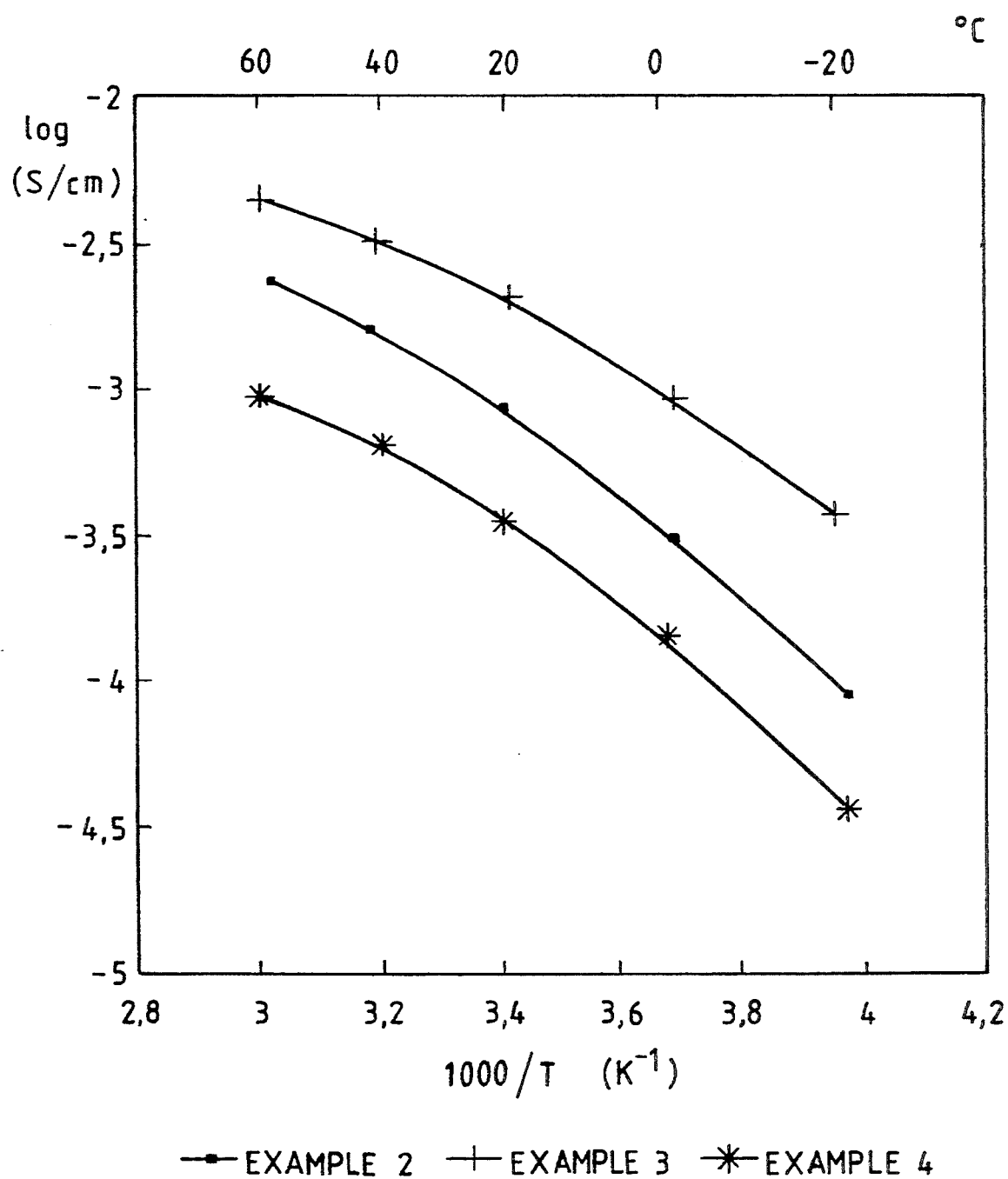
FIG. 1 plots the ionic conductivity of the electrolytic membranes of Examples 2, 3, and 4 as a function of temperature.

The behaviour of the ionic conductivity as a function of temperature, as measured by placing the membrane between two fastening steel electrodes, is reported in FIG. 1. In particular, the ionic conductivity at room temperature results to be of approximately $8.7 \times 10^{-4}$ S/cm.

Example 3

Preparation of an electrolytic membrane by starting from a vinyl ether of formula (I), with $n=3$ and $R=$methyl, and a divinyl ether of formula (II) with $m=3$.

Inside a glove-box, under an argon atmosphere, the following components were mixed together with each other:

| Component          | Weight (g) | % by weight |
| ------------------ | ---------- | ----------- |
| Vinyl ether (I)    | 1.266      | 21.1        |
| Divinyl ether (II) | 0.540      | 9.0         |
| LiClO$_4$          | 0.246      | 4.1         |
| Propylene carbonate| 3.900      | 65          |
| Photoinitiator     | 0.048      | 0.8         | wherein the photoinitiator is bis(4-diphenylsulfoniumphenyl)-sulfide-bis-hexafluorophosphate.

The mixture was stirred with a magnetic drive stirrer until a homogeneous, colourless solution was obtained, which was then coated as a constant-thickness film on a PTFE sheet by using a bar Hand Coater for thickness control.

The resulting film was exposed to U.V. light for 5 seconds, using a medium pressure mercury vapour lamp.

In that way, a homogeneous, colourless electrolytic membrane is obtained, in handeable film form, which displays good adhesive properties and has a thickness of 100 microns.

The glass transition temperature (Tg) of the membrane, as determined by DSC, is of $-100°$ C. Furthermore, the membrane results to be completely amorphous at higher temperatures than its Tg.

The behaviour of the ionic conductivity as a function of temperature, as measured by placing the membrane between two fastening steel electrodes, is reported in FIG. 1. In particular, the ionic conductivity at room temperature results to be of $2.09 \times 10^{-3}$ S/cm.

Example 4

Preparation of an electrolytic membrane by starting from a vinyl ether of formula (I), with $n=3$ and $R=$methyl, and a divinyl ether of formula (II) with $m=3$, using tetraethylene glycol dimethyl ether (TGME) as the plasticizer in lieu of propylene carbonate.

Inside a glove-box, under an argon atmosphere, the following components were mixed together with each other:

| Component          | Weight (g) | % by weight |
| ------------------ | ---------- | ----------- |
| Vinyl ether (I)    | 2.040      | 34          |
| Divinyl ether (II) | 0.540      | 9.0         |
| LiClO$_4$          | 0.354      | 5.9         |
| TGME               | 3.018      | 50.3        |
| Photoinitiator     | 0.048      | 0.8         | wherein the photoinitiator is bis(4-diphenylsulfoniumphenyl)-sulfide-bis-hexafluorophosphate.

The mixture was stirred with a magnetic drive stirrer until a homogeneous, colourless solution was obtained, which was then coated as a constant-thickness film on a PTFE sheet by using a bar Hand Coater for thickness control.

The resulting film was exposed to U.V. light for 5 seconds, using a medium pressure mercury vapour lamp.

In that way, a homogeneous, colourless electrolytic membrane is obtained, in handeable film form, which displays good adhesive properties and has a thickness of 100 microns.

The glass transition temperature (Tg) of the membrane, as determined by DSC, is of −86° C., and the membrane results to be completely amorphous at higher temperatures than its Tg.

The behaviour of the ionic conductivity as a function of temperature, as measured by placing the membrane between two fastening steel electrodes, is reported in FIG. 1. In particular, the conductivity at room temperature results to be of $3.55 \times 10^{-4}$ S/cm.

Example 5

Preparation of an electrolytic membrane by starting from a vinyl ether of formula (I), with n=3 and R=ethyl, and a divinyl ether of formula (II) with n=3. As the ionic compound, $LiBF_4$ is used (98%, Aldrich)

Inside a glove-box, under an argon atmosphere, two mixtures were prepared and were made homogenize, which had the following composition:

| Component | Weight (g) | % by weight |
|---|---|---|
| Mixture (A) | | |
| $LiBF_4$ | 302 | 5.03 |
| Propylene carbonate | 3750 | 62.5 |
| Mixture (B) | | |
| Vinyl ether (I) | 1345 | 22.42 |
| Divinyl ether (II) | 603 | 10.05 |

The homogeneous mixture (A) added to the homogeneous mixture (B).

The resulting solution was then coated, as a constant-thickness film on a PTFE sheet. Crosslinking went to completion within approximately 8 hours.

The resulting electrolytic membrane is homogeneous and colourless, and is an easily handeable film, which displays very good adhesive properties and has a thickness of approximately 100 microns.

The glass transition temperature (Tg) of the membrane, as determined by DSC, is of −101° C., and the membrane results to be completely amorphous.

Figure 2:
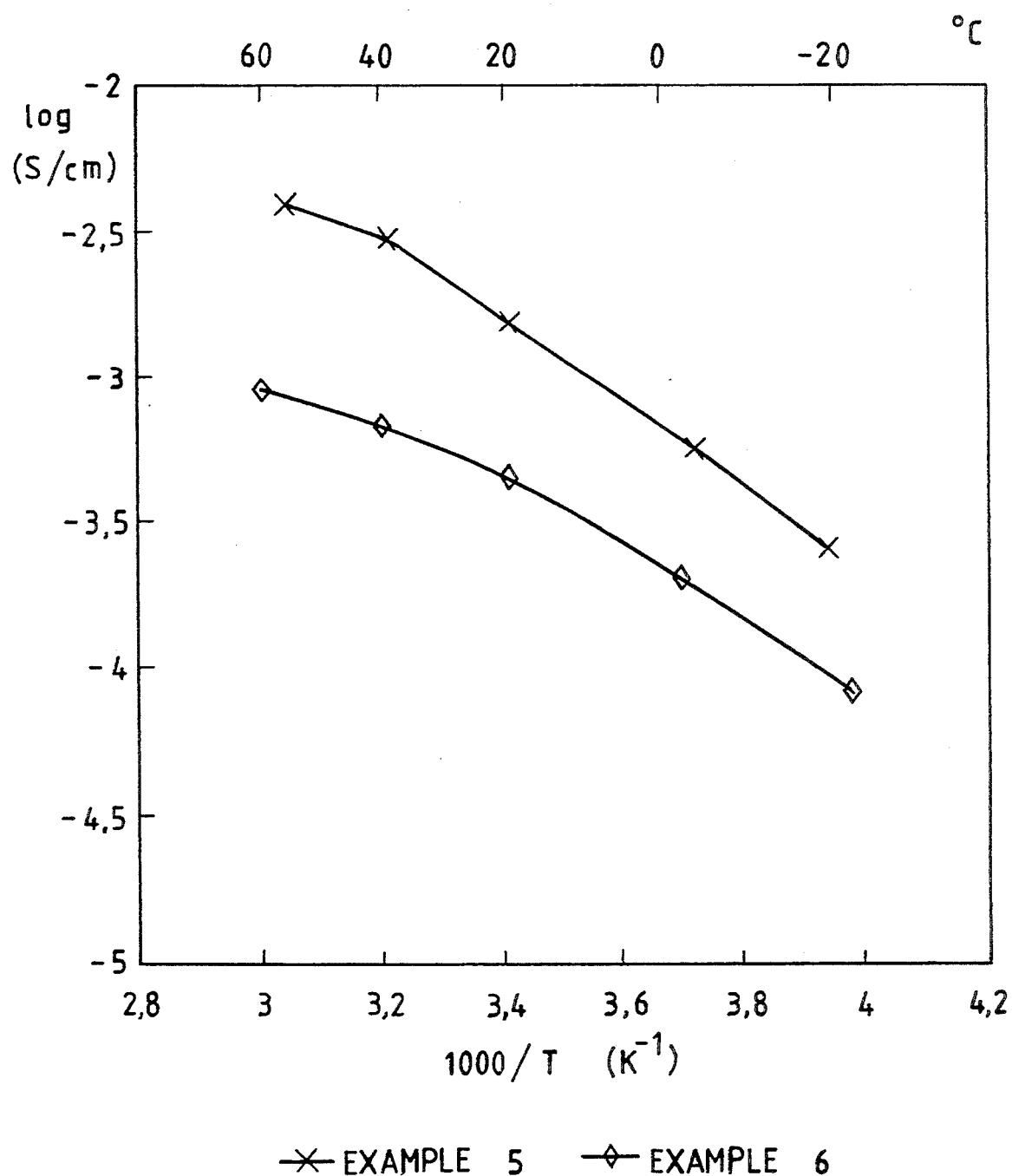
FIG. 2 plots the ionic conductivity of the electrolytic membranes of Examples 5 and 6 as a function of temperature.

The behaviour of the ionic conductivity as a function of temperature, as measured by placing the membrane between two fastening steel electrodes, is reported in FIG. 2. In particular, the conductivity at room temperature results to be of $1.55 \times 10^{-3}$ S/cm.

Example 6

Preparation of an electrolytic membrane by starting from a vinyl ether of formula (I), with n=3 and R=ethyl, and divinyl ether of formula (II) with m=3. As the ionic compound, $LiBF_4$ is used (98%, Aldrich).

Inside a glove-box, under an argon atmosphere, two mixtures were prepared and were made homogenize, which had the following composition:

| Component | Weight (g) | % by weight |
|---|---|---|
| Mixture (A) | | |
| $LiBF_4$ | 288 | 4.8 |
| TGME | 3750 | 62.5 |
| Mixture (B) | | |
| Vinyl ether (I) | 1347 | 22.45 |
| Divinyl ether (II) | 614 | 10.23 |

The homogeneous mixture (A) is added to the homogeneous mixture (B).

The resulting solution was coated, as a constant-thickness film, on a PTFE support. Crosslinking went to completion within approximately 16 hours.

The resulting electrolytic membrane is homogeneous and colourless, is easily handeable with very good adhesive properties, and has a thickness of approximately 100 microns.

The glass transition temperature (Tg) of the membrane, as determined by DSC, is of −99° C., and its Tm is of −38° C.

The behaviour of the ionic conductivity as a function of temperature, as measured by placing the membrane between two fastening steel electrodes, is reported in FIG. 2. In particular, the ionic conductivity at room temperature results to be of $4.4 \times 10^{-4}$ S/cm.

We claim:

1. Process for preparing a solid, polyvinyl ether-based polymeric electrolyte in the form of a membrane, which comprises the steps of:
   (1) preparing a mixture (M) which contains:
      (a) a vinyl ether having the formula

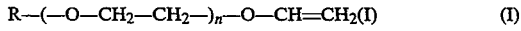

$$R-(-O-CH_2-CH_2-)_n-O-CH=CH_2 \quad (I)$$

where R is methyl or ethyl and n is an integer of from 1 to 16;

(b) a divinyl ether having the formula

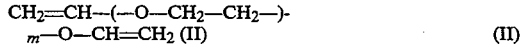

$$CH_2=CH-(-O-CH_2-CH_2-)_m-O-CH=CH_2 \quad (II)$$

where m is an integer of from 1 to 10, in a molar ratio to the vinyl ether (I) of from 2:98 to 60:40;

(c) an ionic compound in an amount of from 1 to 30% by weight; and
   (d) an oligomer or a dipolar aprotic liquid in an amount of from 0 to 80% by weight;
   (2) applying the mixture to an inert support; and
   (3) polymerizing the mixture (M) in the presence of an ultraviolet light source or an electron beam ray source to form the polymeric electrolyte.

2. Process according to claim 1, wherein the polymerizing is carried out by exposure to the ultraviolet light source and wherein the mixture (M) further contains a photoinitiator.

3. Process according to claim 1, wherein the polymerizing is carried out by exposure to the electron beam ray source.

4. Process according to claim 1, wherein the molar ratio of the divinyl ether (II) to the vinyl ether (I) is from 8:92 to 20:80.

5. Process according to claim 1, wherein the ionic compound is present in an amount from 5 to 20% by weight.

6. Process according to claim 1, wherein the ionic compound is a salt of a metal selected from the group consisting of lithium, sodium, potassium, calcium, copper, zinc, magnesium, lead, tin and aluminum.

7. Process according to claim 6, wherein the salt is selected from the group consisting of perchlorate, triflate, tetrafluoroborate, and hexafluoroarsenate metal salts.

8. Process according to claim 6, wherein the atomic ratio of oxygen contained in the polyvinyl ether to the metal in the metal salt is from about 4:1 to 25:1.

9. Process according to claim 6, wherein the metal is lithium.

10. Process according to claim 1, wherein the dipolar aprotic liquid is present in an amount of from 50 to 80% by weight.

11. Process according to claim 1, wherein the dipolar aprotic liquid is selected from the group consisting of propylene carbonate, ethylene carbonate, gammabutyrolactone, acetonitrile and mixtures thereof.

12. Process according to claim 1, wherein the oligomer is selected from the group consisting of oligovinyl ethers, oligomers containing ethylene oxide sequences, and oligoethylene glycol dialkyl ethers.

13. Process according to claim 2, wherein the photoinitiator is present in an amount of from 0.5 to 10% by weight.

14. Process according to claim 2, wherein the photoinitiator is selected from the group consisting of a diaryl iodonium, a triaryl solfonium, a sulfoxonium salt and a ferrocene metal salt.

15. Process according to claim 1, wherein the support is selected from the group consisting of a film of an inert plastic material, a glass, a surface of a lithium anode, and a composite cathode constituted by an oxide or sulfide of a transition metal.

16. Process according to claim 12, wherein the oligomer is selected from the group consisting of polyethylene glycol and tetraglyme.

17. Process according to claim 13, wherein the photoinitiator is present in an amount of from 1 to 5% by weight.

18. Process for preparing a solid, polyvinyl ether-based polymeric electrolyte in the form of a membrane, which comprises the steps of:
  (1) preparing a mixture (A), which contains:
    (a) lithium tetrafluoroborate, as an ionic compound, in an amount of from 1 to 30% by weight;
    (b) an oligomer or a dipolar aprotic liquid in an amount of from 0 to 80% by weight;
  (2) preparing a mixture (B), which contains:
    (a) a vinyl ether having the formula

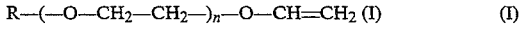

where R is methyl or ethyl and n is an integer of from 1 to 16;
    (b) a divinyl ether having the formula

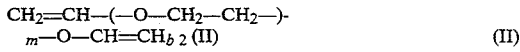

where m is an integer of from 1 to 10, in a molar ratio to the vinyl ether (I) of from 2:98 to 60:40;
  (3) adding mixture (A) to mixture (B) to form mixture (M);
  (4) applying the above mixture (M) onto an inert support; and
  (5) polymerizing the mixture (M) to form the polymeric electrolyte.

* * * * *